United States Patent
Tajima et al.

(10) Patent No.: US 6,657,948 B1
(45) Date of Patent: Dec. 2, 2003

(54) OPTICAL INFORMATION RECORDING MEDIUM

(75) Inventors: Hideharu Tajima, Tenri (JP); Nobuyuki Takamori, Kitakatsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/512,253

(22) Filed: Feb. 24, 2000

(30) Foreign Application Priority Data

Feb. 24, 1999  (JP) .......................................... 11-046189

(51) Int. Cl.[7] .............................. G11B 7/24; G11B 7/26
(52) U.S. Cl. ...................................................... 369/286
(58) Field of Search ............................. 369/286, 275.5, 369/287, 280; 428/694, 64.1; 360/133, 132, 131, 135

(56) References Cited

U.S. PATENT DOCUMENTS

| | | | |
|---|---|---|---|
| 4,525,412 A | * 6/1985 | Nakane et al. | 428/199 |
| 5,364,735 A | * 11/1994 | Akamatsu et al. | 369/286 |
| 5,450,380 A | 9/1995 | Toide et al. | 369/275.5 |
| 5,490,131 A | * 2/1996 | Ohta et al. | 369/275.5 |
| 5,586,110 A | 12/1996 | Nakaki | 369/286 |
| 5,681,632 A | 10/1997 | Kitaura et al. | 428/641 |
| 5,728,441 A | * 3/1998 | Min et al. | 269/288 |
| 6,063,468 A | * 5/2000 | Aratani et al. | 369/288 |
| 6,128,274 A | * 10/2000 | Mori et al. | 369/275.5 |
| 6,353,592 B1 | * 3/2002 | Kashiwagi et al. | 369/286 |

FOREIGN PATENT DOCUMENTS

| | | | | |
|---|---|---|---|---|
| EP | 0918323 A2 | 5/1999 | | |
| JP | 58-158055 | 9/1983 | | |
| JP | 01-182941 | * 7/1989 | | |
| JP | 03-012836 | 1/1991 | | |
| JP | 04-067332 | * 3/1992 | | |
| JP | 01-95745 | 7/1992 | | |
| JP | 04-195745 | 7/1992 | | |
| JP | 364248 | 12/1992 | | |
| JP | 04-364248 | 12/1992 | | |
| JP | 05-089523 | * 4/1993 | | |
| JP | 05-303769 | * 11/1993 | | |
| JP | 07-307036 | * 11/1995 | ........... | G11B/07/24 |
| JP | 09-147431 | * 6/1997 | ........... | G11B/07/26 |
| JP | 09-180254 | * 7/1997 | | |
| JP | 64119 | 3/1998 | | |
| JP | 10-064119 | 3/1998 | | |

* cited by examiner

Primary Examiner—George J. Letscher
Assistant Examiner—Christopher R Beacham
(74) Attorney, Agent, or Firm—Birch, Stewart, Kolasch & Birch, LLP

(57) ABSTRACT

An optical information recording medium includes a transparent substrate, a thin film layer formed on said transparent substrate and having a recording film, a thin film protecting film formed on said thin film layer, and a substrate protecting film formed on said transparent substrates. A neutral plane of deformation caused by a temperature change of the optical information recording medium is present within the thin film layer. Consequently, it has become possible to provide an optical information recording medium which can prevent deformation (warpage) caused by temperature and humidity changes and be readily manufactured.

16 Claims, 10 Drawing Sheets

FIG. 2 (a)     FIG. 2 (b)
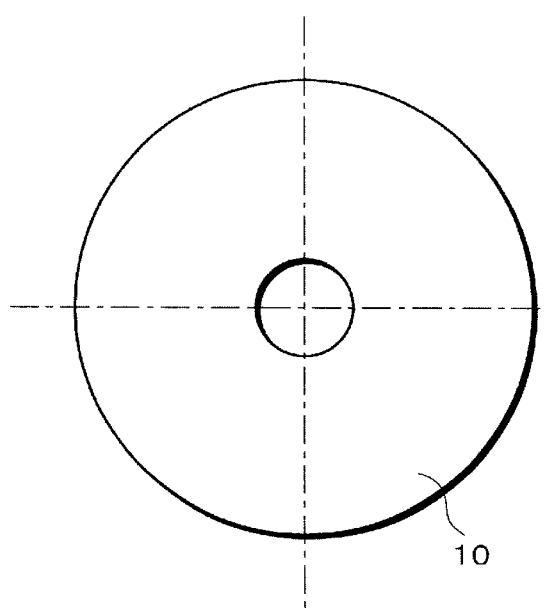
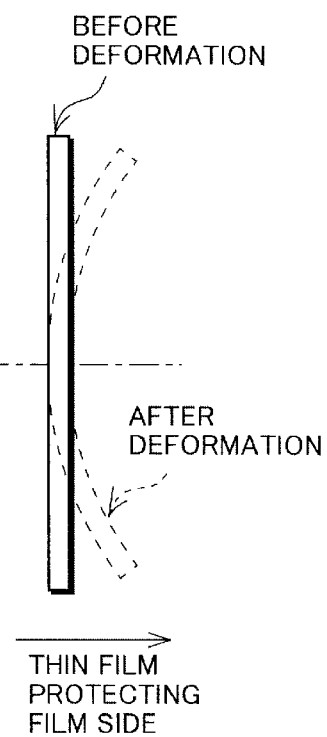

OPTICAL INFORMATION RECORDING MEDIUM

FIELD OF THE INVENTION

The present invention relates to an optical information recording medium for recording and reproducing information, and more particularly, to an optical information recording medium which can suppress warpage caused by a change in environments or variance with time.

BACKGROUND OF THE INVENTION

As an example optical information recording medium for recording and reproducing information, a thin disk type has been known. FIG. 6(a) is a plan view of such an optical information recording medium and FIG. 6(b) is a side elevation thereof.

FIG. 7 is a schematic cross section showing an arrangement of a conventional optical information recording medium 110.

As shown in FIG. 7, the conventional optical information recording medium 110 includes a disk (see FIG. 6(a)) substrate 120 made of polycarbonate or the like, on which a single- or multi-layer thin film layer 140 comprising thin films, such as dielectric films 141 and 143 (silicon nitride, etc.), a recording film 142 (TbFeCo, etc.), and a reflecting film 144 (Al, etc.), is formed by means of sputtering or the like.

Also, a thin film protecting film 150 made of a resin film or the like is formed on the thin film layer 140, and a substrate protecting film 130 made of resin or the like is formed on the light incident surface of the substrate 120.

The thicknesses of these films and layers are as follows: the thickness of the substrate 120 is approximately 1.2 mm; the thickness of the single- or multi-layer thin film layer 140 formed by means of sputtering or the like is 10–30 nm; the thickness of the thin film protecting film 150 is 1–30 $\mu$m; and the thickness of the substrate protecting film 130 is 1–30 $\mu$m. Thus, the substrate 120 made of polycarbonate occupies most of the optical information recording medium 110 in thickness.

The rigidity of the optical information recording medium 110 depends almost entirely on the substrate 120, and because the substrate 120 is sufficiently thick, deformation caused by a change in environments (temperature and humidity changes) is quite small. For this reason, a balance of stress and a bending moment of each layer has not been considered generally in most of the cases.

However, there has been a demand to further increase recording and reproducing density of the optical information recording medium, and the substrate has been made thinner (for example, the thickness is now reduced to 0.6 mm from 1.2 mm) to suppress the occurrence of aberration. As a result, the rigidity of the optical information recording medium is reduced, and larger deformation occurs due to stress produced in each layer forming the optical information recording medium with a change in environments (temperature and humidity changes), thereby posing a problem that information can not be readily recorded and reproduced. Thus, there has been an increasing need for an optical information recording medium which can maintain good performance in response to a change in environments even if its rigidity is reduced by employing a thinner substrate.

Japanese Laid-open Patent Application No. 195745/1992 (Japanese Official Gazette, Tokukaihei No. 195745, published on Jul. 15, 1992) discloses a technique of suppressing deformation of the optical information recording medium, by which a warpage preventing dielectric film is provided on the back surface (the surface on which the thin film layer is not formed) of the substrate (prior art ①).

FIG. 8 is a cross section showing an arrangement of the above optical information recording medium (prior art ①). In FIG. 8, like components are labeled with like reference numerals with respect to FIG. 7 for ease of explanation. As shown in FIG. 8, a dielectric layer 160 is provided on the light incident side of the substrate 120 made of polycarbonate, so that the same expansion coefficient is given to the recording film 142 and dielectric layer 160 which are provided respectively at the both sides of the transparent substrate 120. Consequently, because the optical information recording medium has a symmetrical structure with respect to the substrate 120, warpage of the optical information recording medium can be prevented.

Also, Japanese Laid-open Patent Application No. 64119/1998 (Japanese Official Gazette, Tokukaihei No. 10-64119, published on Mar. 6, 1998) discloses that, by making a thin film protecting film thicker (30–50 $\mu$m), warpage occurring with increasing temperatures can be prevented (prior art ②).

Further, Japanese Laid-open Patent Application No. 364248/1992 (Japanese Official Gazette, Tokukaihei No. 4-364248, published on Dec. 16, 1992) proposes an optical information recording medium which can solve problematic warpage caused by a humidity change. This optical information recording medium includes, as shown in FIG. 9, a thin film protecting film 150, a thin film layer 140, a substrate 120, a substrate protecting film 130, and in order to solve the problem, it additionally includes a moisture permeation preventing film 170 made of $SiO_2$, AlN, etc. between the substrate 120 and substrate protecting film 130 (prior art ③). In FIG. 9, like components are labeled with like reference numerals with respect to FIGS. 7 and 8 for ease of explanation.

However, according to the technique disclosed in Japanese Laid-open Patent Application No. 195745/1992 supra (see FIG. 8, prior art ①), the dielectric layer 160 has to be provided on the light incident side of the substrate 120 by means of sputtering or the like. In this case, the manufacturing procedure includes forming the thin film layer 140 on one surface of the substrate 120, turning over the substrate 120, and forming the dielectric layer 160 on the opposite surface. Thus, not only the manufacturing procedure becomes complex, but also expensive manufacturing facility is required, thereby posing a problem that the manufacturing costs are undesirably increased.

Also, the technique (prior art ②) of Japanese Laid-open Patent Application No. 64119/1998 supra poses a problem that the thin film protecting film is so thick that it can not be readily formed. In addition, in case that the optical information recording medium is a magneto-optical recording medium, for example, in order to turn an applied magnetic field inversely at a high speed while information is being recorded, it is preferable to approximate the thin film layer to magnetic field generating means. However, a too thick thin film protecting film can cause problematic deterioration of magnetic characteristics.

Further, the technique of Japanese Laid-open Patent Application No. 364248/1992 supra (see FIG. 9, prior art ③) demands the moisture permeation preventing film 170 made of $SiO_2$, AlN, etc. to be provided on the light incident side of the substrate 120 by means of sputtering or the like. In this case, the manufacturing procedure includes forming the thin film layer 140 on one surface of the substrate 120, turning over the substrate 120, and forming the moisture permeation preventing film 170 on the opposite surface. Thus, not only the manufacturing procedure becomes complex, but also expensive manufacturing facility is required, thereby posing a problem that the manufacturing costs are undesirably increased.

SUMMARY OF THE INVENTION

It is therefore an object of the present invention to provide an optical information recording medium which can prevent deformation (warpage) caused by temperature and humidity changes and be readily manufactured.

In order to fulfill the above and other objects, an optical information recording medium of the present invention is characterized by being furnished with:
- a thin film layer, formed on a substrate, for recording and reproducing information; and
- a thin film protecting film, formed on the thin film layer, for protecting the thin film layer,
- a neutral plane of deformation in a thickness direction caused by a temperature change being present in a vicinity of the thin film layer.

According to the above arrangement, the optical information recording medium has a multi-layer structure in which the thin film layer and thin film protecting film are formed on the substrate.

If the substrate is made thinner in the optical information recording medium having such a multi-layer structure, the rigidity is reduced, thereby posing a problem that warpage occurs in the thickness direction toward the thin film protecting film in response to a temperature change.

To solve the above problem, a conventional optical information recording medium employing a thin substrate is additionally provided with a warpage preventing dielectric layer. This solution, however, raises another problem that, by providing the additional layer, the number of manufacturing steps and manufacturing costs are undesirably increased. In particular, because the dielectric layer is formed on the opposite side (the side opposite to the side where the thin film layer is formed) of the substrate, the substrate has to be turned over after the thin film layer is formed. Accordingly, not only the manufacturing procedure becomes complex, but also expensive manufacturing facility is required, thereby increasing the manufacturing costs.

In contrast, according to the arrangement of the present invention, the neutral plane of deformation in the thickness direction caused by a temperature change is present in the vicinity of the thin film layer. In other words, bending moments applied on the thin film layer from the substrate side and thin film protecting film side are substantially cancelled out with each other.

More specifically, warpage of the optical information recording medium in the direction toward the thin film protecting film is caused by a bending moment applied on the thin film layer from the substrate side. Thus, according to the arrangement of the present invention, the bending moment applied on the thin film layer from the substrate side is cancelled out with a bending moment applied thereon from the thin film protecting film side, and the vicinity of the thin film layer serves as the neutral plane of deformation in the thickness direction. Hence, the optical information recording medium of the present invention causes warpage neither in the thickness direction nor in the opposite direction.

Consequently, different from the conventional arrangement, the additional warpage preventing dielectric layer can be omitted, thereby eliminating the problem that the manufacturing procedure becomes complex and the manufacturing costs are increased.

In order to fulfill the above and other objects, another optical information recording medium of the present invention is characterized by being furnished with:
- a thin film layer, formed on a substrate, for recording and reproducing information;
- a thin film protecting film, formed on the thin film layer, for protecting the thin film layer; and
- a substrate protecting film, formed on the substrate on a surface opposite to a surface where the thin film layer is formed, for protecting the substrate,
- a moisture permeation degree of the substrate protecting film being smaller than a moisture permeation degree of the thin film protecting film.

In case of the optical information recording medium in which the thin film layer and thin film layer protecting film are formed on one side of the substrate and the substrate protecting film on the other side, only a slight quantity of water is absorbed from the external and reaches the substrate in the thin film protecting film side because of the thin film layer interposed therebetween, whereas water readily reaches the substrate in the substrate protecting film side. Thus, there is a problem that a volume change occurs locally on the substrate in response to a humidity change, thereby causing warpage of the optical information recording medium.

In order to solve such a problem, a conventional optical information recording medium is additionally provided with a moisture permeation preventing film which can prevent warpage caused by a humidity change. This solution, however, raises another problem that, by providing the additional layer, the number of manufacturing steps and manufacturing costs are undesirably increased. In particular, because between the substrate and substrate protecting film, the substrate has to be turned over after the thin film layer is formed. Accordingly, not only the manufacturing procedure becomes complex, but also expensive manufacturing facility is required, thereby increasing the manufacturing costs.

In contrast, according to the arrangement of the present invention, a moisture permeation degree of the substrate protecting film is smaller than that of the thin film protecting film. Hence, because absorption of water from the substrate protecting film side can be reduced, warpage of the optical information recording medium caused by a humidity change can be suppressed.

Consequently, different from the conventional arrangement, the additional moisture permeation preventing film can be omitted, thereby eliminating the problem that the manufacturing procedure becomes complex and the manufacturing costs are increased.

For a fuller understanding of the nature and advantages of the invention, reference should be made to the ensuing detailed description taken in conjunction with the accompanying drawings.

BRIEF DESCRIPTION OF THE DRAWINGS

FIGS. 2(a) and 2(b) are views explaining warpage of the optical information recording medium;

DESCRIPTION OF THE EMBODIMENTS

Embodiment 1

The following will explain an optical information recording medium of the present embodiment, and the principle of the present invention will be given in the first place.

① Principle

Figure 8:
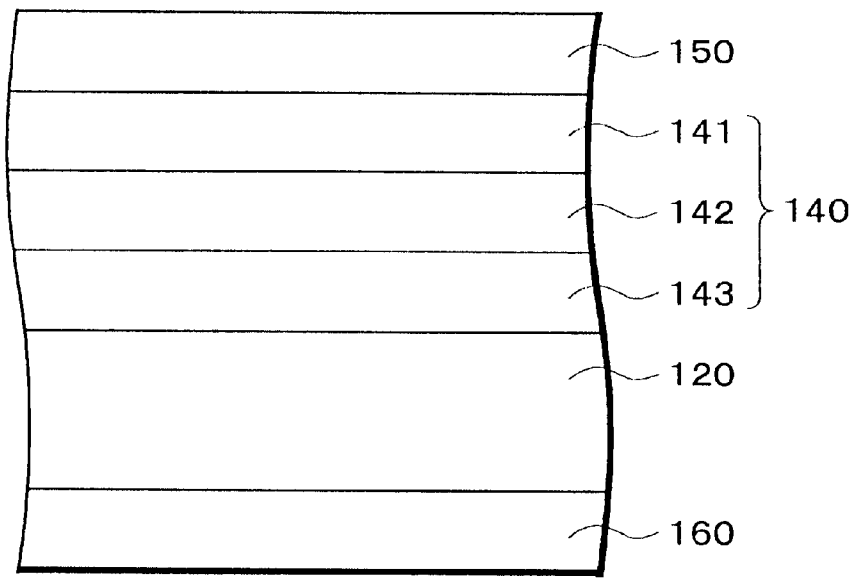
FIG. 8 is a schematic cross section showing an example of a conventional optical information recording medium.
Figure 9:
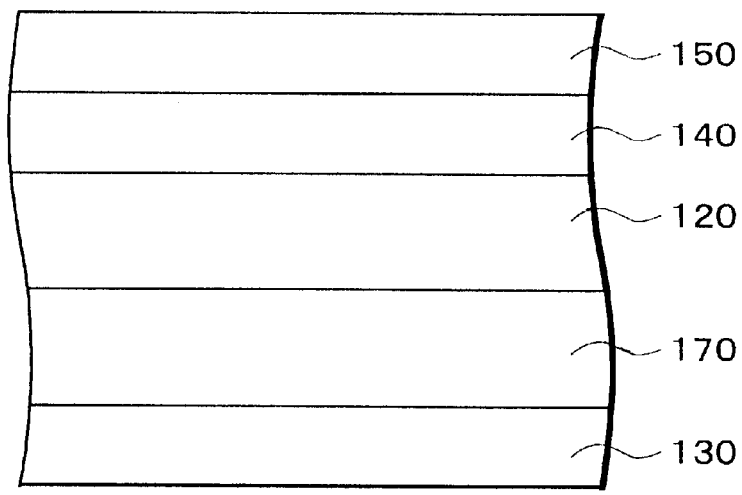
FIG. 9 is a schematic cross section showing another example of a conventional optical information recording medium.

As has been discussed in the BACKGROUND OF THE INVENTION, the optical information recording medium disclosed in Japanese Laid-open Patent Application No. 195745/1992 supra (see FIG. 8) suppresses warpage of the optical information recording medium by forming the layers symmetrically with respect to the transparent substrate 120.

Figure 1:
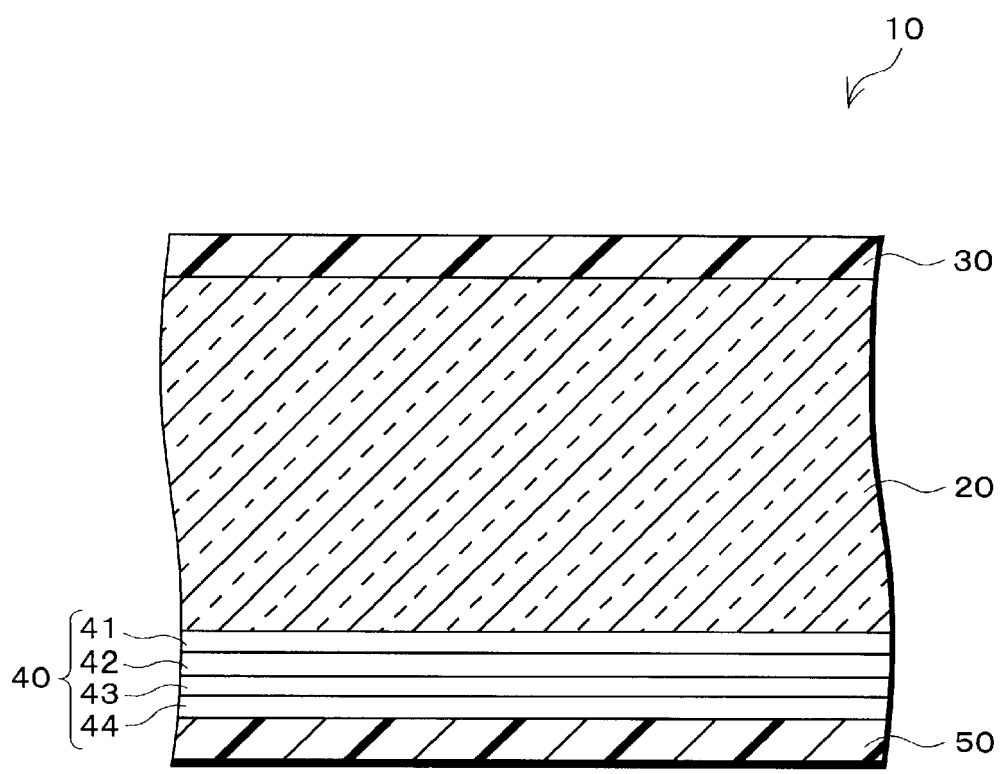
FIG. 1 is a schematic cross section showing an arrangement of an optical information recording medium in accordance with an embodiment of the present invention.

In this regard, with an optical information recording medium 10 including, as shown in the schematic cross section of FIG. 1, a thin film protecting film 50, a thin film layer 40, a transparent substrate (substrate) 20, and a substrate protecting film 30, the inventors of the present invention discovered that (a) warpage of the optical information recording medium 10 can be suppressed by positioning the thin film layer 40 (or the vicinity thereof) at the center of deformation caused by a temperature change, that is, making the optical information recording medium 10 symmetrical with respect to the thin film layer 40, and (b) the thin film protecting film 50 can be made thinner while warpage is suppressed. This will be described more in detail in the following.

As shown in FIG. 1, the optical information recording medium 10 includes the transparent substrate 20 made of polycarbonate or the like, on which the single- or multi-layer thin film layer 40 comprising thin films, such as dielectric films 41 and 43 (silicon nitride, etc.), a recording film 42 (TbFeCo, etc.), and a reflecting film 44 (Al, etc.), is formed by means of sputtering or the like. In addition, the thin film protecting film 50 mainly made of resin is formed on the thin film layer 40, and the substrate protecting film 30 mainly made of resin is formed on the transparent substrate 20 on the opposite surface to the surface where the thin film layer 40 is formed, so that the transparent substrate 20 is protected.

As has been discussed, the optical information recording medium is generally composed of multiple layers, and because each layer has different linear expansion coefficient as one of the physical properties, stress produced in each layer in response to a temperature change is also different.

To be more specific, the transparent substrate 20 made of polycarbonate, substrate protecting film 30, and thin film protecting film 50 normally have larger linear expansion coefficients than the thin film layer 40, and expansion of the thin film layer 40 in the radius direction of the substrate is quite small compared with that of the other layers. Also, the thickness of the transparent substrate 20 is quite large compared with the thicknesses of the substrate protecting film 30 and thin film protecting film 50, and each thin film forming the thin film layer 40 has quite large Young's modulus compared with the other layers. Thus, in response to a temperature change, the thin film layer 40 expands slightly while the transparent substrate 20 expands significantly. As a result, the optical information recording medium 10 readily causes warpage in a direction perpendicular to the radius direction toward the thin film protecting film 50 in the film thickness direction. FIG. 2(a) is a plan view schematically explaining warpage, and FIG. 2(b) is a side elevation thereof.

In the present embodiment, in order to prevent such warpage, a bending moment is applied to the thin film layer 40 in the opposite direction to a bending moment applied thereto from the transparent substrate 20 by adjusting the linear expansion coefficient, Young's modulus, and film thickness of the thin film protecting film 50 formed on the thin film layer 40. Then, by using a plane parallel to the film surface within the thin film layer 40 (or in the vicinity thereof) as a neutral plane of deformation, deformation (warpage shown in FIGS. 2(a) and 2(b)) caused by a temperature change can be suppressed.

To be more specific, the optical information recording medium 10 of the present invention is arranged in such a manner that a neutral plane of deformation in the thickness direction caused by a temperature change is present in the vicinity of the thin film layer 40. In other words, the optical information recording medium 10 of the present invention is arranged in such a manner that bending moments applied on the thin film layer 40 from the substrate 20 side and thin film protecting film 50 side in response to a temperature change are substantially cancelled out with each other.

In order to realize such an arrangement, the thickness, Young's modulus, linear expansion coefficient of each of the substrate 20, thin film layer 40, and the thin film protecting film 50 (particularly the thin film protecting film 50) are set to their respective desired values.

The linear expansion coefficient, Young's modulus, film thickness of the thin film protecting film 50 are set in accordance with the approximate calculations set forth below.

Figure 3:
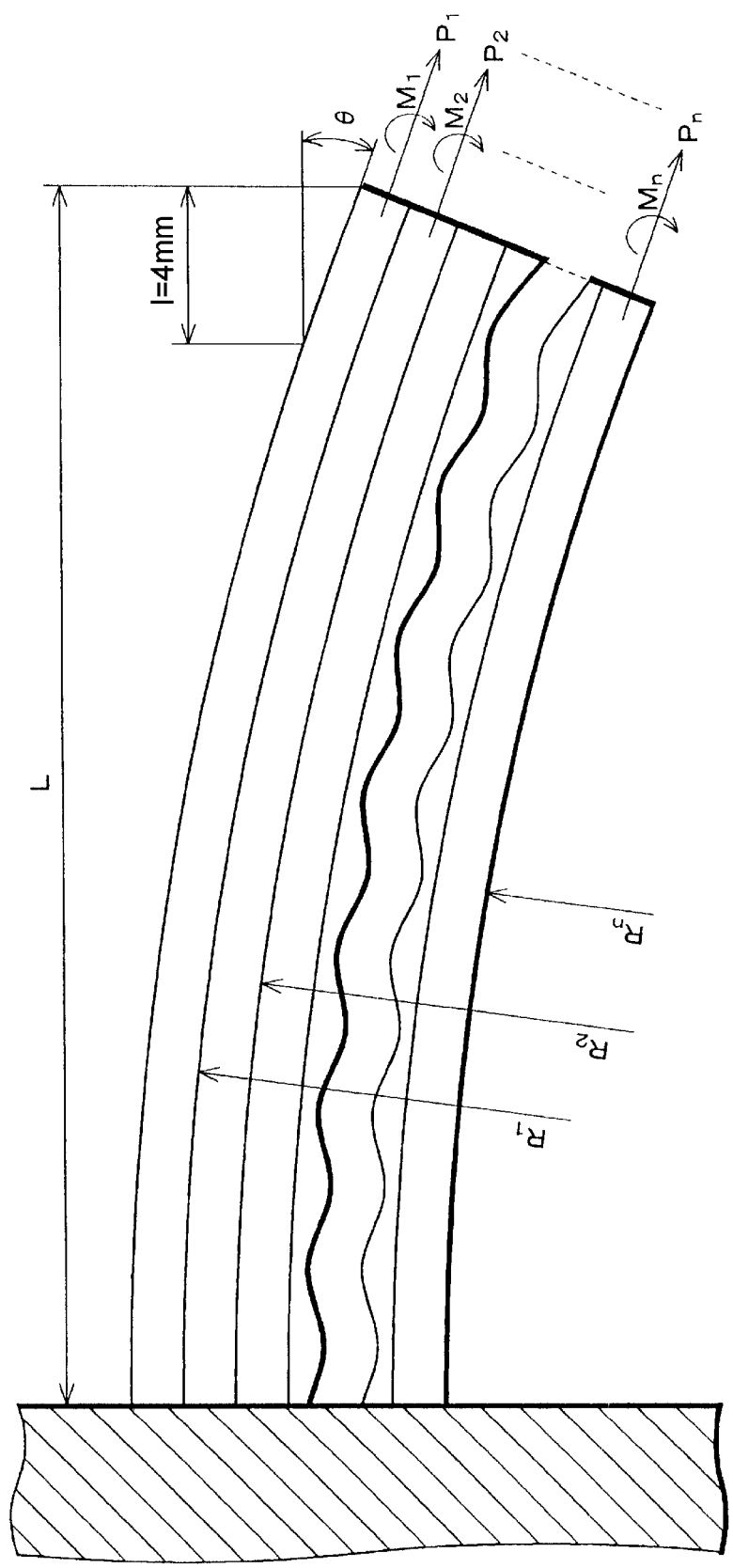
FIG. 3 is a view explaining a multi-layer beam.

In the optical information recording medium 10, three kinds of stress are produced in response to a temperature change: stress (axial tension) applied in the radius direction; stress applied in a circumferential direction; and stress applied in the film thickness direction. However, because the optical information recording medium 10 is a disk, the stress applied in the circumferential direction is even within the circumference, and a force in the film thickness direction is applied evenly within each layer. Therefore, these two kinds of stress can be assumed as non-contributing factors to deformation. Hence, deformation, that is, warpage (see FIGS. 2(a) and 2(b)), of the optical information recording medium 10 can be replaced with warpage in a multi-layer beam which corresponds to the cross section of the same. FIG. 3 shows the multi-layer beam, in which n-layer beam are illustrated, where n represents the number of layers in the optical information recording medium. In case of the optical information recording medium 10 of FIG. 1, n=7.

Warpage angles θ in the multi-layer beam in response to a temperature change can be expressed by following Equations (1) through (5) derived from a balance of the axial tension $P_i$ (i=1, 2, . . . , n) and bending moment $M_i$ in each layer:

$$M_i = E_i I_i / R_i \quad (1)$$

$$\alpha_i T + (P_i/bt_iE_i) - (t_i/2R_i) = \alpha_{i+1}T + (P_{i+1}/bt_{i+1}E_{i+1}) + (t_{i+1}/2R_{i+1}) \quad (2)$$

$$\sum_{i=1}^{n} P_i = 0 \quad (3)$$

$$\sum_{i=1}^{n} M_i + P_1\{y - (t_1/2)\} + P_2\{y - t_1 - (t_2/2)\} +$$
$$\ldots + P_n\{y - t_1 - t_2 - \ldots - (t_n/2)\} = 0 \quad (4)$$

$$\theta = \tan^{-1}((L-2)/R) \quad (5)$$

where $\alpha_i$: linear expansion coefficient of the i layer
$E_i$: Young's modulus of the i layer
$t_i$: thickness of the i layer
$P_i$: axial tension in the i layer
$M_i$: bending moment in the i layer
$R_i$: radius of curvature
$I_i$: secondary moment of the i layer's cross section
b: width of multi-layer beam (unit length)
T: temperature change
L: length of a beam
y: neutral plane's position in the n-layer beam
θ: warpage angles (see FIG. 3) at the largest variation part when a length l=4 mm.

Because the thickness of each layer is far smaller than the radius of curvature, the radius of curvature ($R_i$) in each layer (i=1, 2, . . . , n) can be deemed as equal ($R_1=R_2=R_3=\ldots=R$). Also, a temperature change (T) is a temperature change in the usable temperature environment (generally, from −15° C. to 80° C.) of the optical information recording medium.

In Equations (1) through (5) above, the thickness, linear expansion coefficient (α), and Young's modulus (E) of each layer (particularly those of the thin film protecting film 50, because those of the thin film layer 40 are often determined in advance by characteristics of the optical information recording medium) are determined in such a manner that, when y is set within the thin film layer 40, small θ is given, that is, a large radius of curvature (R) is given. Consequently, an optical information recording medium which can suppress warpage shown in FIGS. 2(a) and 2(b) caused by a temperature change can be obtained.

Incidentally, when the thin film protecting film 50 in the optical information recording medium becomes thicker, it becomes more difficult to form the same by means of spin coating. Also, in case that the optical information recording medium is a magneto-optical recording medium, if the thin film protecting film 50 becomes thicker, the magnetic head is spaced apart farther from the thin film layer 40, which is not preferable from the view points of magnetic characteristics. In view of the foregoing, the film thickness of the thin film protecting film 50 is preferably set to 30 μm or less, and more preferably to 20 μm or less. Thus, the thin film protecting film 50 has to satisfy the above film thickness condition (30 μm or less (preferably 20 μm or less)), and at the same time it has to be made of materials having the linear expansion coefficient (α) and Young's modulus (E) such that can reduce θ in Equations (1) through (5) above. According to Equations (1) through (5) above, even if the film thickness is small, θ can be reduced by making at least one of the linear expansion coefficient (α) and Young's modulus (E) large.

As has been discussed, with the optical information recording medium 10 of the present embodiment, the occurrence of warpage can be suppressed by setting the physical properties of each layer (particularly the thin film protecting film 50) in such a manner that the neutral plane of deformation caused by a temperature change is positioned within (or in the vicinity of) the thin film layer 40. In addition, of all the layers forming the optical information recording medium 10, the thin film layer 40 having the slowest deformation rate causes the slightest deformation, and overshoot of variation, which causes a problem when a temperature actually changes, also becomes small. Further, because only the substrate protecting film 30 mainly made of resin has to be formed on the light incident side of the transparent substrate 20, the optical information recording medium 10 can be manufactured more readily in comparison with the spin coating or the like, thereby simplifying the manufacturing procedure.

The above description explained that the physical properties of each of the layers (particularly the thin film protecting film 50) forming the optical information recording medium 10 are set by using the materials characteristics of these layers, so that the neutral plane of deformation caused by a temperature change is present within (or in the vicinity of) the thin film layer 40. However, in general, each layer forming the thin film layer 40 of the optical information recording medium 10 is so thin that the thin film layer 40 can be deemed as a single layer, and the physical properties of each layer (particularly the thin film protecting film 50) may be set in such a manner that the bending moments applied on the thin film layer 40 in response to a temperature change from the both sides (the transparent substrate 20 and substrate protecting film 30 side and the thin film protecting film 50 side) are substantially cancelled out with each other. In this case, warpage of the thin film layer 40 caused by a temperature change can be also eliminated almost completely. By taking the fact that the transparent substrate 20 has a considerable thickness into consideration, in order to reduce the thickness of the thin film protecting film 50 (30 $\mu$m or less (preferably 20 $\mu$m or less)), at least one of the linear expansion coefficient ($\mu$) and Young's modulus (E) of the thin film protecting film 50 has to be larger than those of the transparent substrate 20.

② Examples 1 and 2 and Comparative Example 1

Next, the following will explain examples of the optical information recording medium 10 formed based on the above principle. In Examples 1 and 2 and Comparative Example 1, the thin film layer 40 was made of an aluminum nitride layer alone. This is because, in most of the cases, deformation of the thin film layer 40 is caused by the dielectric layer made of aluminum nitride, etc. Also, in Examples 1 and 2 and Comparative Example 1, the substrate protecting film 30 was omitted. Thus, it should be appreciated that when the substrate protecting film 30 is formed, the physical properties of each layer (particularly the thin film protecting film 50) have to be set in consideration of the presence of the substrate protecting film 30.

A medium formed as Example 1 included a substrate (transparent substrate) 20 made of polycarbonate, on which an aluminum nitride thin film layer (thin film layer 40), and UV curable resin 1 (thin film protecting film 50) designed under the conditions in accordance with Equations (1) through (5) above were formed. An optical information recording medium formed as Comparative Example 1 included a polycarbonate substrate, on which an aluminum nitride thin film layer and convectional UV curable resin 2 (thin film protecting film) were formed. The arrangements of Example 1 and Comparative Example 1 are set forth in Table 1 and Table 2 below.

TABLE 1

Example 1

|  | MATERIAL | FILM THICKNESS | YOUNG'S MODULUS (Pa) | LINEAR EXPANSION COEFFICIENT (1/° C.) |
|---|---|---|---|---|
| TRANSPARENT SUBSTRATE | POLYCARBONATE | 0.6 mm | 2.41E + 09 | 6.00E − 05 |
| THIN FILM LAYER | ALUMINUM NITRIDE | 79 nm | 3.43E + 11 | 5.60E − 06 |
| THIN FILM PROTECTING FILM | UV CURABLE RESIN 1 | 16 $\mu$m | 1.80E + 09 | 7.10E − 05 |

TABLE 2

Comparative Example 1

|  | MATERIAL | FILM THICKNESS | YOUNG'S MODULUS (Pa) | LINEAR EXPANSION COEFFICIENT (1/° C.) |
|---|---|---|---|---|
| TRANSPARENT SUBSTRATE | POLYCARBONATE | 0.6 mm | 2.41E + 09 | 6.00E − 05 |
| THIN FILM LAYER | ALUMINUM NITRIDE | 79 nm | 3.43E + 11 | 5.60E − 06 |
| THIN FILM PROTECTING FILM | UV CURABLE RESIN 2 | 15 $\mu$m | 1.80E + 09 | 5.62E − 05 |

Table 1 and Table 2 reveal that the difference between Example 1 and Comparative Example 1 was the liner expansion coefficient of the UV curable resin (thin film protecting film 50), and the one having a larger linear expansion coefficient was used in Example 1. As the transparent substrate 20, a disk having the minor diameter of 15 mm and the major diameter of 120 mm was used in both Example 1 and Comparative Example 1.

A temperature change (T=30° C.) was given to the media of Example 1 and Comparative Example 1 (temperatures of the media were raised from 25° C. to 55° C.), and a variation of warpage angles θ at the outer circumference portion (r=56 mm) with time was analyzed. The reason why a variation of warpage angles was analyzed instead of the warpage angles itself is because the medium has its own warpage angles at normal temperature, and the warpage angles itself does not precisely represent deformation caused by a temperature change.

Figure 4:
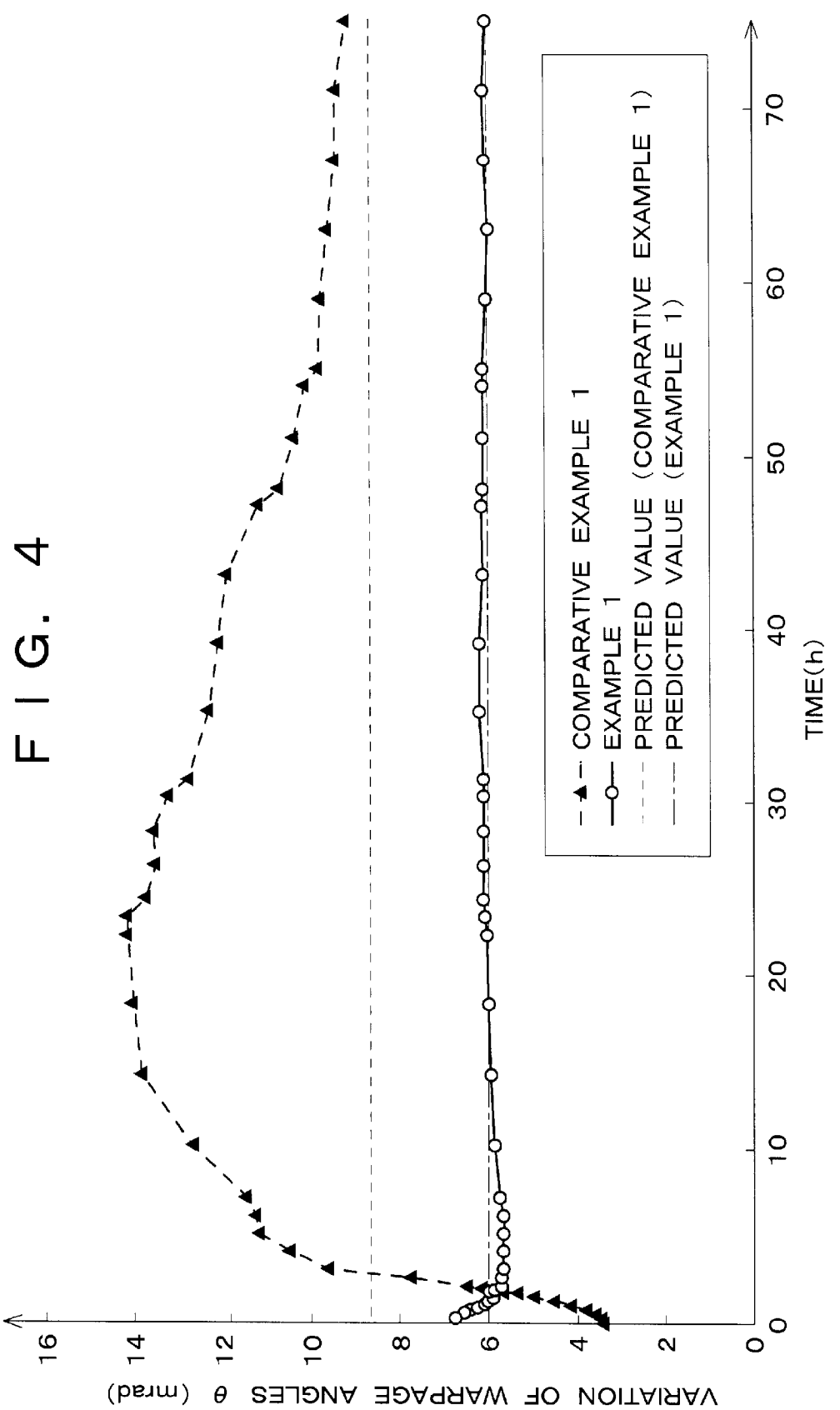
FIG. 4 is a view showing time dependency of a variation of warpage angles in response to a temperature change.

FIG. 4 shows the analysis results. Both the largest variation and normal state value of variation of warpage angles of the medium of Example 1 were smaller than those of the medium of Comparative Example 1. Thus, it is understood that deformation was suppressed in the medium of Example 1. FIG. 4 reveals that, according to Example 1, even if the film thickness was 20 μm or less, no significant temporal warpage occurred in response to a temperature change. Further, FIG. 4 also shows predicted variations of warpage angles θ calculated in accordance with Equations (1) through (5) above, and these predicted approximate values were very close to the actual values, thereby proving reliability of the approximate values.

Next, the following will explain a medium (Example 2) using UV curable resin 3 having large Young's modulus. The medium of Example 2 had different UV curable resin characteristics from those in the medium of Example 1. The arrangement of Example 2 is set forth in Table 3 below.

rises while information is recorded or reproduced, problems, such as defective reproduction, can be controlled. In addition, the thin film protecting film 50 can be made thinner.

Embodiment 2

The present embodiment will explain an optical information recording medium which can prevent deformation caused by a humidity change.

① Principle

The optical information recording medium 10 of FIG. 1 employs the substrate made of polycarbonate or the like as the transparent substrate 20. Thus, under high humidity circumstance, the transparent substrate 20 absorbs moisture and expands, thereby causing deformation of the optical information recording medium 10. In particular, when a moisture permeation degree of the substrate protecting film 30 is greater than that of the thin film protecting film 50, a deformation rate of the substrate 20 becomes faster than that of the thin film protecting film 50. Accordingly, large overshoot of a variation occurs when humidity actually changes, thereby raising a serious problem.

In the present embodiment, the above problem occurring in practical use is solved by suppressing the overshoot by making a moisture permeation degree of the substrate protecting film 30 smaller than that of the thin film protecting film 50.

② Example

A medium formed as Example 3 was identical with the medium of Example 1 above except that the substrate

TABLE 3

Example 2

| | MATERIAL | FILM THICKNESS | YOUNG'S MODULUS (Pa) | LINEAR EXPANSION COEFFICIENT (1/° C.) |
|---|---|---|---|---|
| TRANSPARENT SUBSTRATE | POLYCARBONATE | 0.6 mm | 2.41E + 09 | 6.00E − 05 |
| THIN FILM LAYER | ALUMINUM NITRIDE | 79 nm | 3.43E + 11 | 5.60E − 06 |
| THIN FILM PROTECTING FILM | UV CURABLE RESIN 3 | 16 μm | 3.60E + 09 | 5.68E − 05 |

A variation of warpage angles θ predicted by calculations in accordance with Equations (1) through (5) above was 5.18 mrad, and it is understood that warpage caused by a temperature change was reduced significantly compared with Comparative Example 1.

As has been discussed, according to the optical information recording medium of the present embodiment, temporal significant warpage caused by a temperature change can be suppressed. Thus, even when the temperature of the medium protecting film 30 made of UV curable resin 4 was additionally provided. A medium formed as Comparative Example 2 for purpose of comparison was also identical with the medium of Example 1 except that the substrate protecting film 30 made of UV curable resin 5 was additionally provided. Moisture permeation degrees of the UV curable resins of Example 3 and Comparative Example 2 are set forth in Table 4 below.

TABLE 4

| | SUBSTRATE PROTECTING FILM | | THIN FILM PROTECTING FILM | |
|---|---|---|---|---|
| | FILM | MOISTURE PERMEATION DEGREE (g/m² · day) | FILM | MOISTURE PERMEATION DEGREE (g/m² · day) |
| EXAMPLE 3 | UV CURABLE RESIN 4 | 2.20E + 02 | US CURABLE RESIN 1 | 4.60E + 02 |
| COMPARATIVE EXAMPLE 2 | UV CURABLE RESIN 5 | 9.70E + 02 | UV CURABLE RESIN 1 | 4.60E + 02 |

A humidity change was given to the media of example 3 and Comparative Example 2 (ambient humidity was increased from 50% to 90%), and a variation of warpage angle θ at the outer circumference portion (r=56 mm) with time was analyzed.

Figure 5:
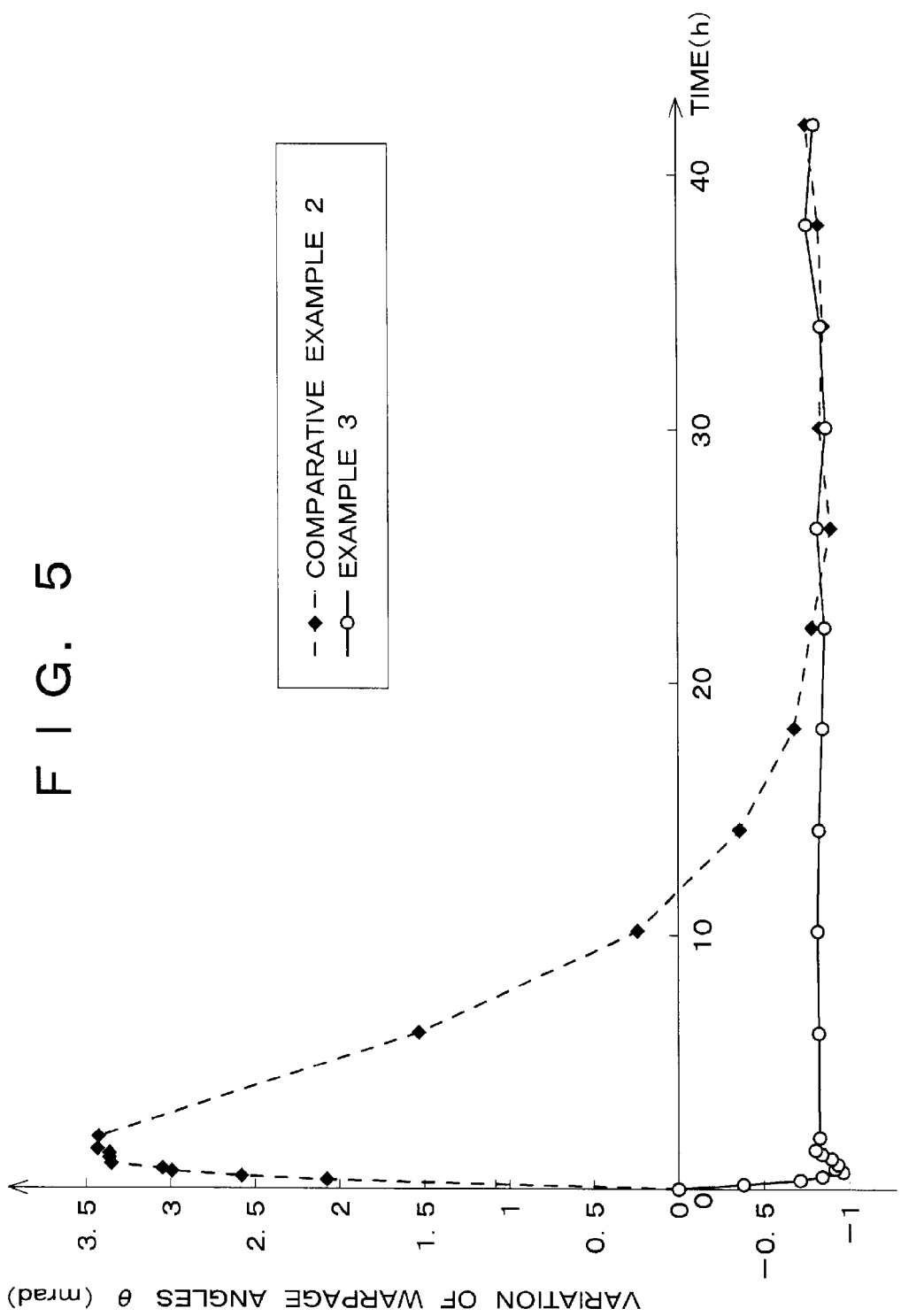
FIG. 5 is a view showing time dependency of a variation of warpage angles in response to a humidity change.
Figure 6:
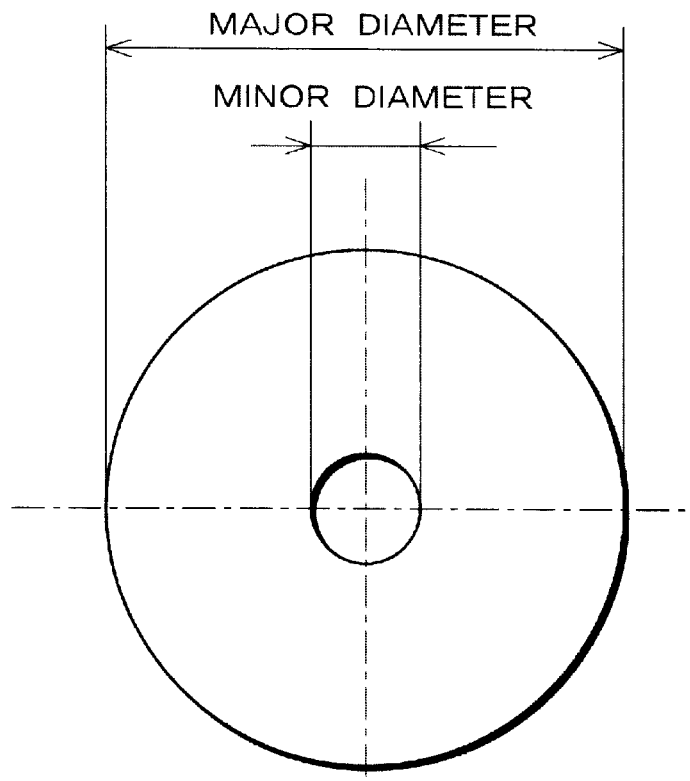
FIG. 6(a) is a plan view showing an arrangement of a typical optical information recording medium.
FIG. 6(b) is a side elevation thereof.
Figure 6:
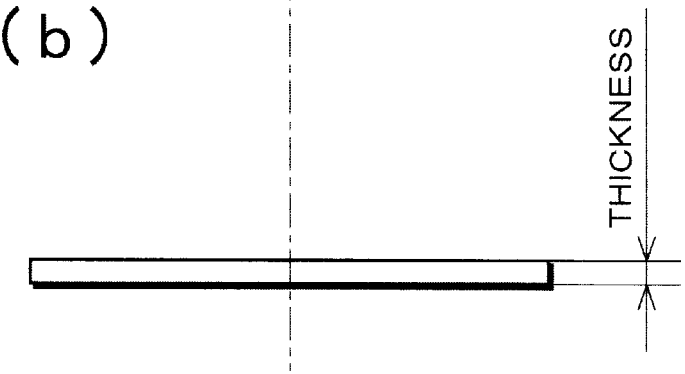
Figure 7:
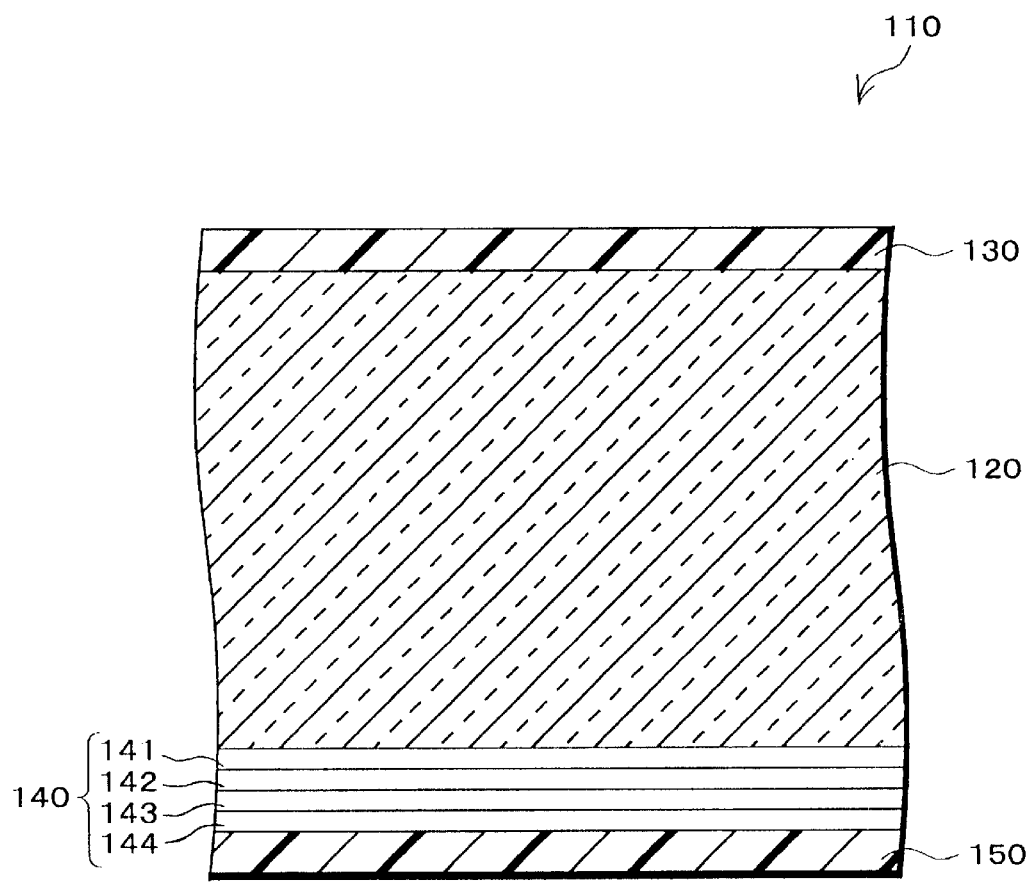
FIG. 7 is a schematic cross section showing an arrangement of a conventional optical information recording medium.

FIG. 5 shows the analyzed result. The largest variation (at the overshoot) of warpage angles in Example 3 was quite small compared with that in Comparative Example 2, and it is understood that deformation caused by a humidity change was suppressed in the medium of Example 3.

The foregoing principles stand up for polycarbonate substrates or the like thinner than those used in Examples 1 through 3, which will be explained in Example 4 as follows.

A medium formed as Example 4 was identical with the medium of Example 3 except that the thickness of the substrate (transparent substrate) 20 was 0.5 mm (the arrangements are set forth in Table 5 below), and a variation of warpage angles θ in response to the temperature change and humidity change was analyzed.

TABLE 5

| | MATERIAL | FILM THICKNESS | YOUNG'S MODULUS (Pa) | LINEAR EXPANSION COEFFICIENT (1/° C.) | MOISTURE PERMEATION DEGREE (g/m² · day) |
|---|---|---|---|---|---|
| SUBSTRATE PROTECTION FILM | UV CURABLE RESIN 6 | 3 μm | 6.8E + 09 | 5.0E − 05 | 2.2E + 02 |
| TRANSPARENT SUBSTRATE | POLY-CARBONATE | 0.5 mm | 3.2E + 09 | 6.0E − 05 | |
| THIN FILM LAYER | ALUMINUM NITRIDE | 75 nm | 3.4E + 11 | 5.6E − 06 | |
| THIN FILM PROTECTING FILM | UV CURABLE RESIN 7 | 12 μm | 5.9E + 09 | 7.2E − 05 | 4.6E + 02 |

Figure 10:
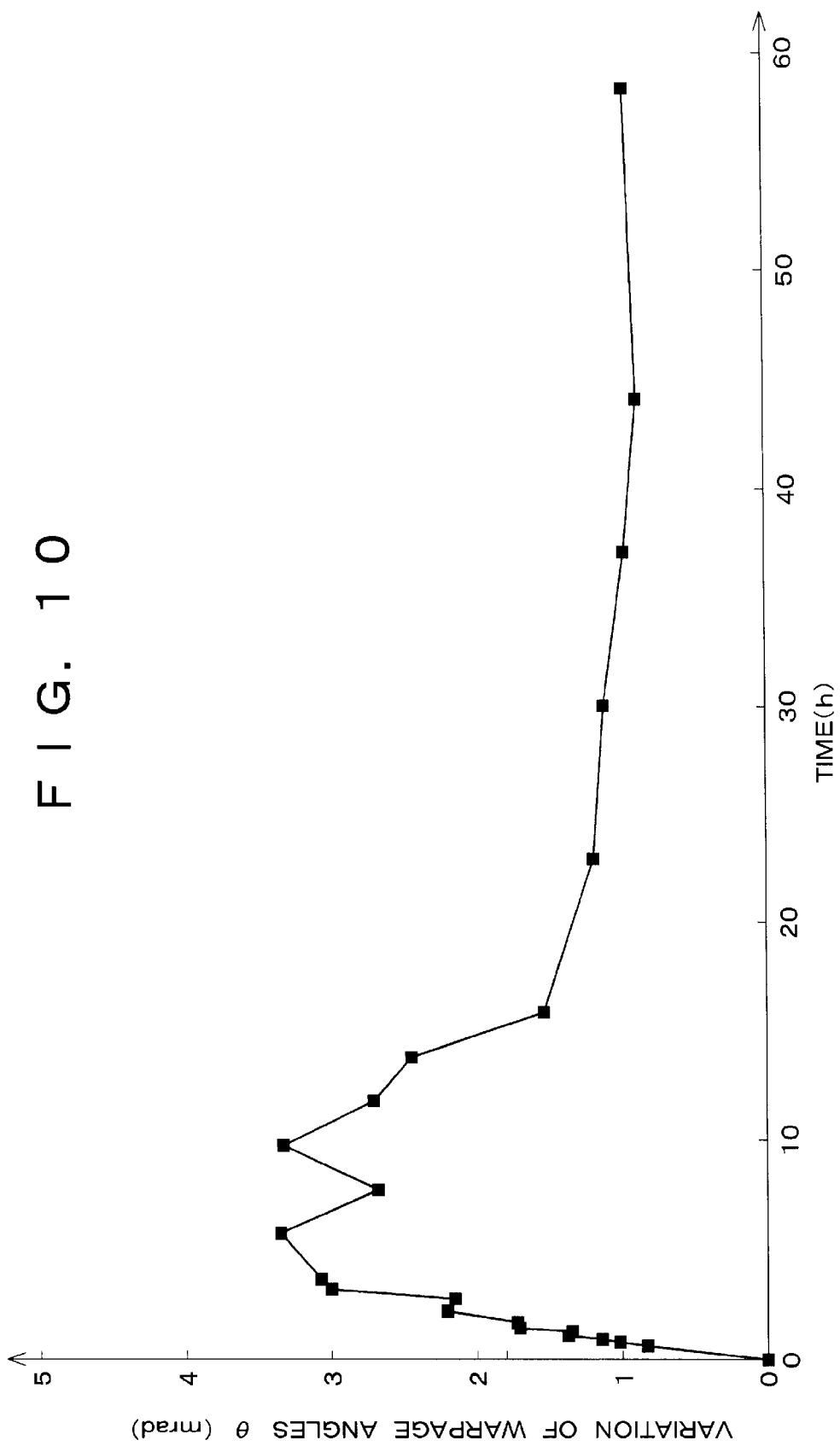
FIG. 10 is a view showing time dependency of a variation of warpage angles in response to a temperature change in an optical information recording medium as one example of the present invention.
Figure 11:
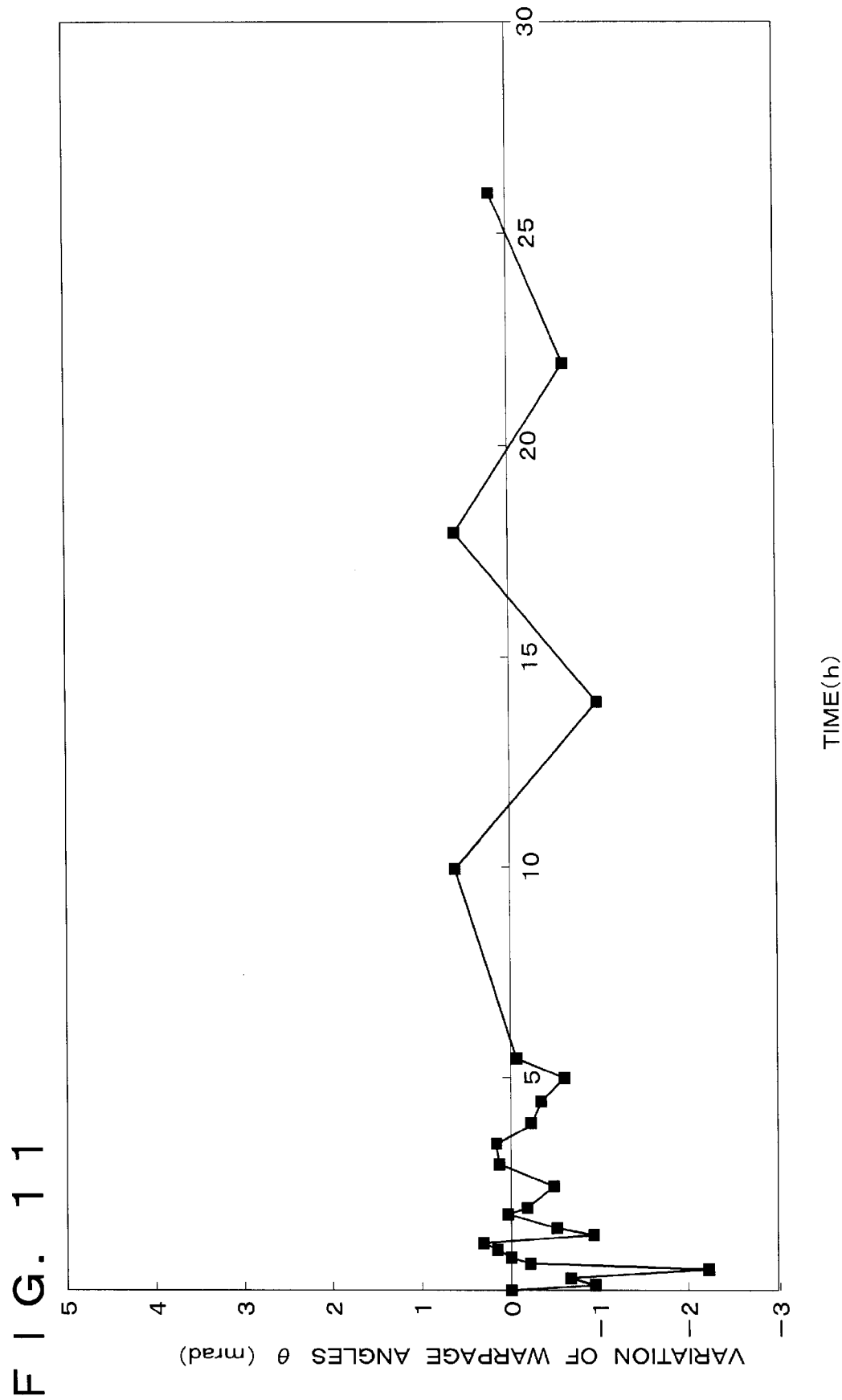
FIG. 11 is a view showing time dependency of a variation of warpage angles in response to a humidity change in an optical information recording medium as one example of the present invention.

FIGS. 10 and 11 show the analysis result. FIG. 10 shows a transitional variation of tilt along radius in response to a temperature change (a change from 25° C. at 50% to 70° C. at 30% was given), and FIG. 11 shows a variation of tilt along radius in response to a humidity change (a change from 25° C. at 60% to 25° C. at 90% was given). The transparent substrate 20 had a minor diameter of 7 mm and a major diameter of 60 mm. The analysis results reveal that the foregoing principles stand up even in a case where a thinner transparent substrate 20 is used, and therefore, a variation of warpage can be also suppressed in such a case.

As has been discussed, according to the optical information recording medium of the present embodiment, even if humidity changes, no temporal significant warpage occurs, thereby suppressing a problematic defective reproduction when information is recorded and reproduced.

In the optical information recording medium of the present embodiment, if the physical properties of the thin film protecting film 50 and substrate protecting film 30 are set so as to form the neutral plane of deformation caused by a temperature change within (or in the vicinity of) the thin film layer 40 as was discussed in Embodiment 1, not only can deformation caused by a humidity change be prevented as was discussed herein, but also deformation caused by a temperature change can be prevented.

As has been discussed, in the present invention, by arranging the optical information recording medium in such a manner that the neutral plane of deformation caused by a temperature change is present within (or in the vicinity of) the thin film layer, such as a magnetic film, a variation caused by a temperature change can be reduced, thereby enhancing information recording and reproducing reliability.

Also, in the optical information recording medium, by making at least one of Young's modulus and linear expansion coefficient of the thin film protecting film larger than those of the transparent substrate, the thin film protecting film can be made thinner. Consequently, the optical information recording medium can be readily manufactured. Moreover, in case of a magneto-optical recording medium, the magnetic characteristics can be improved.

In addition, by providing a substrate protecting film having a smaller moisture permeation degree than that of the thin film protecting film, a variation caused by a humidity change can be reduce, thereby enhancing information recording and reproducing reliability.

An optical information recording medium of the present invention, including at least a transparent substrate, a thin film layer formed on the transparent substrate and having at least one of a recording film and a reflecting film, and a thin film protecting film formed on the thin film layer and mainly made of resin, may be arranged in such a manner that the neutral plane of deformation in the film thickness direction caused by a temperature change while information recorded and reproduced is present in the vicinity of the thin film layer.

Also, an optical information recording medium of the present invention, including at least a transparent substrate a thin film layer formed on the transparent substrate and having at least one of a recording film and a reflecting film, and a thin film protecting film formed on the thin film layer and mainly made of resin, may be arranged in such a manner that bending moments applied on the thin film layer from the both sides in the film thickness direction are substantially equal.

In addition, an optical information recording medium of the present invention, including at least a transparent substrate, a thin film layer formed on the transparent substrate and having at least one of a recording film and a reflecting film, and a thin film protecting film formed on the thin film layer and mainly made of resin, may be arranged in such a manner that at least one of Young's modulus and the linear expansion coefficient of the thin film protecting film is larger than those of the transparent substrate, respectively.

Further, an optical information recording medium of the present invention may be arranged in such a manner that the film thickness of the thin film protecting film is 20 µm or less.

In addition, an optical information recording medium of the present invention, including at least a transparent substrate, a thin film layer formed on the transparent substrate and having at least one of a recording film and a reflecting film, a thin film protecting film formed on the thin film layer and mainly made of resin, and a substrate protecting film formed on the lights incident side of the transparent substrate and mainly made of resin, may be arranged in such a manner that a moisture permeation degree of the thin film protecting film is smaller than that of the substrate protecting film.

The neutral plane of deformation referred to herein means a plane expressed by a value of y when warpage angles θ is almost 0 (zero) in Equations (1) through (5) above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical information recording medium including:
   a thin film layer, formed on a substrate, for recording and reproducing information; and
   a thin film protecting film, formed on said thin film layer for protecting said thin film layer,
   the thin film protecting layer being in direct physical contact with the thin film layer,
   wherein a thickness, Young's modulus, and a linear expansion coefficient are set to their respective desired values in each of said substrate, thin film layer, and thin film protecting film, so that
   a neutral plane of deformation in a thickness direction caused by a temperature change being present in a vicinity of said thin film layer.

2. An optical information recording medium including:
   a thin film layer, formed on a substrate, for recording and reproducing information; and
   a thin film protecting film, formed on said thin film layer, for protecting said thin film layer,
   bending moments applied on said thin film layer from a substrate side and a thin film protecting film side in response to a temperature change being substantially cancelled out with each other.

3. The optical information recording medium of claim 2, wherein, a thickness, Young's modulus, and a linear expansion coefficient are set to their respective desired values in each of said substrate, thin film layer, and thin film protecting film, so that the neutral plane of deformation in the thickness direction caused by a temperature change is present in the vicinity of said thin film layer, and
   the thin film protecting layer being in direct physical contact with the thin film layer.

4. The optical information recording medium of claim 1, wherein at least one of Young's modulus and the linear expansion coefficient of said thin film protecting film is larger than one of Young's modulus and the linear expansion coefficient of said substrate, respectively.

5. The optical information recording medium of claim 1, wherein the thickness of said thin film protecting film is 20 µm or less.

6. The optical information recording medium of claim 1, further including a substrate protecting film, formed on said substrate on a surface opposite to a surface where said thin film layer is formed, for protecting said substrate, a moisture permeation degree of said substrate protecting film being smaller than a moisture permeation degree of said thin film protecting film.

7. An optical information recording medium at least including:
   a transparent substrate;
   a thin film layer formed on said transparent substrate having at least one of a recording film and a reflecting film; and
   a thin film protecting film formed on said thin film layer and mainly made of resin,
   the thin film protecting layer being in direct physical contact with the thin film layer,
   wherein a thickness, Young's modulus, and a linear expansion coefficient are set to their respective desired values in each of said substrate, thin film layer, and thin film protecting film, so that
   a neutral plane of deformation in a film thickness direction caused by a temperature change while information is recorded and reproduced being present in a vicinity of said thin film layer.

8. An optical information recording medium at least including:
   a transparent substrate;
   a thin film layer formed on said transparent substrate and having at least one of a recording film and a reflecting film; and a thin film protecting film formed on said thin film layer and mainly made of resin, bending moments applied on said thin film layer from both sides thereof in a film thickness direction being substantially equal.

9. An optical information recording medium at least including:

a transparent substrate;

a thin film layer formed on said transparent substrate and having at least one of a recording film and a reflecting film;

a thin film protecting film formed on said thin film layer and mainly made of resin, the thin film protecting layer being in direct physical contact with the thin film layer;

at least one of Young's modulus and a linear expansion coefficient of said thin film protecting film being larger than one of Young's modulus and a linear expansion coefficient of said transparent substrate, respectively; and a thickness, Young's modulus, and a linear expansion coefficient are set to their respective desired values in each of said substrate, thin film layer, and thin film protecting film, so that the neutral plane of deformation in the thickness direction caused by a temperature change is present in the vicinity of said thin film layer.

10. The optical information recording medium of claim 7, wherein a film thickness of said thin film protecting film is 20 mm or less.

11. The optical information recording medium of claim 8, wherein a film thickness of said thin film protecting film is 20 mm or less.

12. The optical information recording medium of claim 9, wherein a film thickness of said thin film protecting film is 20 mm or less.

13. The optical information recording medium of claim 3, wherein at least one of Young's modulus and the linear expansion coefficient of said thin film protecting film is larger than one of Young's modulus and the linear expansion coefficient of said substrate, respectively.

14. The optical information recording medium of claim 3, wherein the thickness of said thin film protecting film is 20 mm or less.

15. The optical information recording medium of claim 3, further including a substrate protecting film, formed on said substrate on a surface opposite to a surface where said thin film layer is formed, for protecting said substrate, a moisture permeation degree of said substrate protecting film being smaller than a moisture permeation degree of said thin film protecting film.

16. An optical information recording medium including:

a thin film layer, formed on a substrate, for recording and reproducing information; and a thin film protecting film, formed on said thin film layer for protecting said thin film layer, the thin film protecting layer being in direct physical contact with the thin film layer, wherein a thickness, Young's modulus, and a linear expansion coefficient are set to their respective desired values in each one of said substrate, thin film layer, and thin film protecting film, so that a bending moment generated between the substrate and the thin film layer in response to a temperature change and a bending moment generated between the thin film layer and the film protecting film in response to a temperature changed are substantially cancelled out with each other.

* * * * *